US009990914B2

(12) United States Patent
Korn (10) Patent No.: US 9,990,914 B2
(45) Date of Patent: *Jun. 5, 2018

(54) SYSTEM AND METHOD FOR DYNAMICALLY INTERACTING WITH A MOBILE COMMUNICATION DEVICE BY SERIES OF SIMILAR SEQUENTIAL BARGE IN SIGNALS TO INTERRUPT AUDIO PLAYBACK

(71) Applicant: Talkler Labs, LLC, Belmont, MA (US)

(72) Inventor: Jeffrey Korn, Belmont, MA (US)

(73) Assignee: Talkler Labs, LLC, Belmont, MA (US)

( * ) Notice: Subject to any disclaimer, the term of this patent is extended or adjusted under 35 U.S.C. 154(b) by 615 days.

This patent is subject to a terminal disclaimer.

(21) Appl. No.: 13/931,056

(22) Filed: Jun. 28, 2013

(65) Prior Publication Data
US 2014/0006032 A1 Jan. 2, 2014

Related U.S. Application Data

(60) Provisional application No. 61/665,556, filed on Jun. 28, 2012.

(51) Int. Cl.
| | |
|---|---|
| *G10L 15/00* | (2013.01) |
| *G10L 21/00* | (2013.01) |
| *H04N 5/76* | (2006.01) |
| *G05B 23/02* | (2006.01) |
| *G06F 7/04* | (2006.01) |
| *G10L 13/00* | (2006.01) |
| *G06F 3/0481* | (2013.01) |
| *H04M 1/725* | (2006.01) |

(Continued)

(52) U.S. Cl.
CPC .......... *G10L 13/00* (2013.01); *G06F 3/04815* (2013.01); *H04M 1/72547* (2013.01); *G10L 25/51* (2013.01); *G10L 2015/088* (2013.01); *H04M 2250/12* (2013.01)

(58) Field of Classification Search
CPC ...... G10L 15/22; G06Q 30/02; G11B 27/002; G06F 3/0482; G06F 3/04815
USPC .................................................. 704/246, 277
See application file for complete search history.

(56) References Cited

U.S. PATENT DOCUMENTS

| 5,899,582 A * | 5/1999 | DuLac ................. G11B 27/002 |
| | | 386/235 |
| 6,839,669 B1 * | 1/2005 | Gould .................... G10L 15/22 |
| | | 704/246 |

(Continued)

*Primary Examiner* — Farzad Kazeminezhad
(74) *Attorney, Agent, or Firm* — Goodwin Procter LLP (57) ABSTRACT

Audio presentations of a media content delivered onto a device are interrupted using commands not otherwise known to or programmed in to a messaging application used to present the content to the user of the device. In one embodiment, an electronic message having textual content is received at the mobile device, where it is translated into an audio stream, and presented (i.e., played back) to the user of the device within the messaging application. The user provides, and the application receives a string of identical user commands that are not specifically defined or programmed in as commands within the messaging application, and playback of the audio stream is modified according to the received string of user commands.

36 Claims, 7 Drawing Sheets

(51) Int. Cl.
　　　*G10L 25/51*　　　(2013.01)
　　　*G10L 15/08*　　　(2006.01)

(56) References Cited

U.S. PATENT DOCUMENTS

| | | | | |
|---|---|---|---|---|
| 2005/0033582 A1* | 2/2005 | Gadd | ................... | G06Q 30/02 |
| | | | | 704/277 |
| 2009/0153288 A1* | 6/2009 | Hope | ................... | G06F 3/0482 |
| | | | | 340/3.1 |
| 2013/0307790 A1* | 11/2013 | Konttori | ............... | G06F 3/0488 |
| | | | | 345/173 |
| 2013/0326583 A1* | 12/2013 | Freihold | ............. | G06F 3/04815 |
| | | | | 726/3 |
| 2014/0168110 A1* | 6/2014 | Araki | ................... | G06F 3/016 |
| | | | | 345/173 |

* cited by examiner

SYSTEM AND METHOD FOR DYNAMICALLY INTERACTING WITH A MOBILE COMMUNICATION DEVICE BY SERIES OF SIMILAR SEQUENTIAL BARGE IN SIGNALS TO INTERRUPT AUDIO PLAYBACK

CROSS-REFERENCE TO RELATED APPLICATIONS

This application claims priority to and the full benefit of U.S. Provisional Patent Application No. 61/665,556, filed on Jun. 28, 2012, the disclosure of which is incorporated by reference in its entirety.

FIELD OF THE INVENTION

This invention relates generally to methods and supporting systems for dynamically interacting with a mobile communication device, and, more specifically, to interact via voice commands.

BACKGROUND OF THE INVENTION

Mobile devices have become ubiquitous in the everyday life of the general consumer. No longer are cellular phones, electronic personal data assistants, and Internet-connected hand-held devices reserved for the elite. As these devices become ingrained in consumers' daily routines, the use of the devices in situations in which safety, convenience and even appropriateness have become issues. For example, drivers routinely attempt to text, email and talk on their phone while driving. "Hands-free" operation has made use of these devices somewhat more acceptable in certain instances, but the user experience is less than ideal.

For example, the present state of the art does not provide a method for a user to effectively "barge in" to a device operating with a speech recognition system and text-to-speech system, while the text-to-speech system is producing simulated speech. Because a built-in microphone may be used to detect any user utterance, speech recognition technology often cannot distinguish between a user's voice attempting to control the mobile communication device, the voice of the text-to-speech system, the user's voice when the user is not providing direction to the device, and other voices and other background sounds that are audible in the acoustic environment.

This problem is common in systems such as interactive voice response (IVR) phone trees, which have difficulty deciphering spoken requests that are not directly responsive to the phone tree prompts (such as user requests to be transferred to an "operator"), due to the noise floor of the environment or connection problems, or due to the limitations of modern speech recognition technology. Similar issues are found in "constant" listening applications that are continually screening ambient audio for commands.

This situation may be exacerbated over speakerphone systems—such as are common in automobiles for hands-free cell phone use—because the mobile communication device microphone may be picking up both the voice of the user and the voice of recorded prompts from the IVR system. Speakerphone systems also exacerbate the problem because their microphones do not discriminate among sounds in the acoustic environment, which sounds can include voices other than that of the user, as well as other background sounds such as road noise. Hence, "barging in" or "getting the attention" of a device by speaking a specifically pre-defined voice command is ineffective by virtue of the limited accuracy of conventional speech recognition.

Additionally, some mobile voice-controlled applications deliver audio content themselves, such as simulated speech (text-to-speech), music or video. Because many devices place the speaker used for delivering the audio content in close proximity to the microphone used for detecting voice commands, it is even more difficult for the device to hear and distinguish the user's voice over audio content it is delivering.

For "barging in" or "getting the attention" of a device via user voice command, the device must be constantly listening to all acoustic signals in the environment and attempting to detect a specifically predefined "barge in" command. Today's mobile devices and the applications that run on such devices perform much of their speech recognition using cloud-based services, so constantly listening can be prohibitively expensive for the user from a data usage standpoint under current mobile data plans offered by cell carriers. There is also a latency associated with transmitting every utterance and sound from the mobile device to the cloud for speech recognition processing, which makes the mobile device inadequately responsive to such spoken barge-in commands. And "barge-in" commands are rendered impotent if the data connection between the mobile device and the network is lost. Also, constant listening takes a dramatic toll on battery life.

What is needed, therefore, is a system and techniques that allow a user to effectively and reliably interrupt or "get the attention" of an application using audible user signals, under a variety of acoustic conditions and in the presence of competing audio signals or noise, and without requiring access to a data network.

SUMMARY OF THE INVENTION

In various embodiments the disclosed system and methods provide a software Application that functions in conjunction with a speech recognizer to enable a user to listen to and interact with the mobile communication device using primarily his or her voice, in an essentially hands-free and eyes-free manner. The software application further allows the user to "barge-in" by providing a repeated signal to the device such as tapping on or speaking to the mobile communication device. Accordingly, the user can readily interact with the mobile communication device when otherwise pre-occupied, such as, for example, when the user is behind the wheel of a car, or getting dressed in the morning.

Therefore, in one aspect, a method for interrupting a presentation of a message delivered onto a mobile device includes receiving an incoming electronic message with textual content at the mobile device and translating the textual content to an audio stream. The audio stream is played back on the device using a messaging application. A string of substantially identical user commands which are not being specifically defined as commands within the messaging application are received and used to trigger interruption of playback of the audio stream.

The electronic message may be an electronic mail message, a text message, an SMS message, a news story, a broadcast message, a calendar event description, a web page, a web-based article, a web log (blog), a weather report, a digital text document, a task from a task list, or other structured electronic content.

The string of identical user commands comprise a repetition of utterances, sounds, gestures, movements or actions. In some cases, the commands may be simple, monosyllabic phrases, whereas in other cases they may be other brief spoken utterances, whereas in other cases they may be a repetitive touching, movement, tapping or striking of the device.

Interruption of playback may include halting, initiating, resuming, repeating, rewinding, or fast forwarding the playback of the audio stream. In some cases, additional details related to the message may be presented to the user. Subsequent, predefined commands may also be used to effect playback of the audio stream.

In another aspect, a system for interrupting a presentation of a message delivered onto a mobile device includes a processor for executing computer-executable instructions and a memory for storing the computer-executable instructions, that when executed by the processor implements a message presentation application. The message presentation application facilitates the interruption of an audible representation of the message by receiving an incoming electronic message with textual content at the mobile device and translating the textual content to an audio stream. The audio stream is played back on the device using a messaging application. A string of substantially identical user commands which are not being specifically defined as commands within the messaging application are received and used to trigger interruption of playback of the audio stream.

In another aspect, the invention provides a method for triggering an operation within a software application operating on a physical device using audible user-generated signals. A string of substantially similar user-generated signals which are not specifically predefined within the application are received at a device and the user signals are validated to meet specified criteria for similarity. The signals are translated into an application command, which triggers a specified operation within the application based on the application commands.

The string of substantially similar, user-generated signals may be a series of verbal utterances, percussive knocks, or clapping of hands, a repetitive touching of or tapping on the device, a repetitive movement of the device, or a repetitive movement of an object near the device.

Validation of the signals may include determining if an amplitude of each of the signals falls within an acceptable range, if the amplitude of each of the signals is substantially similar, if the time elapsed between of each of the signals is substantially similar, and/or if certain acoustic characteristics (e.g., pitch and sound curve) of each of the signals are substantially similar. Validation may also include determining if the timing between of each of the signals is substantially similar, and/or if the duration of each of the signals is substantially similar. Since some of the signals described herein may be non-acoustic (e.g., touching or movement), validation may also include determining if other measurable characteristics of the signals (e.g., force or direction) are substantially similar. The specified operation triggered within the application may include pausing the delivery of audio by the application, halting the application, listening for a user voice command to be received at the application and/or initiating the delivery of media content by the application.

DETAILED DESCRIPTION OF THE INVENTION

Figure 1:
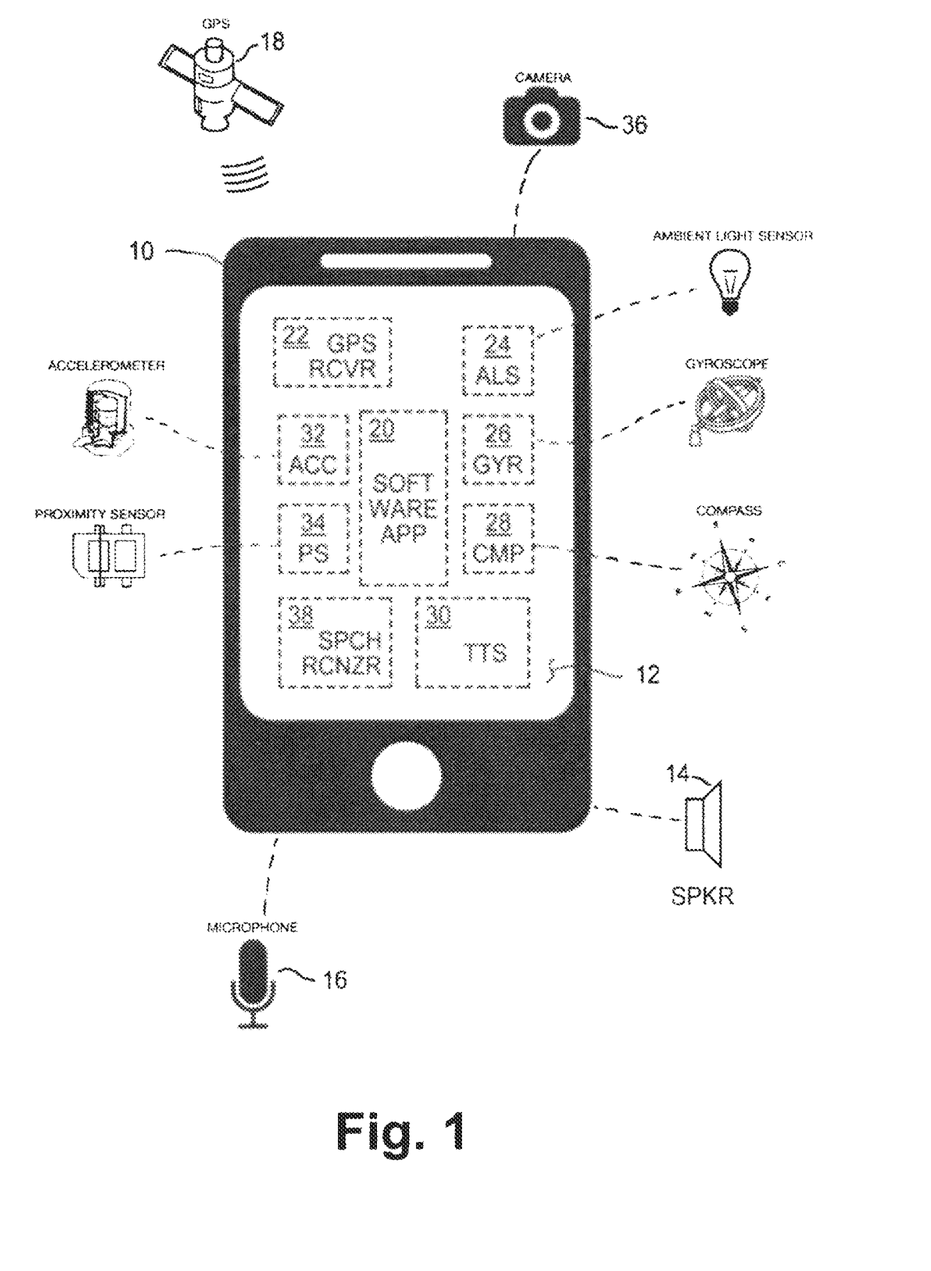
FIG. 1 is a diagrammatical illustration of a mobile communication device with the disclosed Software Application, in accordance with the present invention.

There is shown in FIG. 1 a mobile communication device 10, such as an IPHONE, a SMARTPHONE, an ANDROID, or a BLACKBERRY. The mobile communication device 10 may also include a cradle (not shown) or other physical mounting unit that supports the mobile communication device 10 in view of the user. This configuration allows the user to operate the mobile communication device 10 in an essentially hands-off and eyes-free mode.

The mobile communication device 10 may include a Software Application 20, in accordance with an exemplary embodiment of the present invention. The Software Application 20 functions in conjunction with a speech recognizer 38 to enable the user to listen to and interact with the mobile communication device 10, as described in greater detail below. In an exemplary embodiment, the user may interact with the mobile communication device 10 by selectively glancing at a display screen 12, listening to a speaker 14 in the mobile communication device 10, and providing verbal prompts to a microphone 16 in the mobile communication device 10.

A typical mobile communication device may include one or more internal sensors to enhance functionality and provide additional features to the user. For example, the mobile communication device 10 may include one or more of: (i) a GPS receiver 22 for receiving positioning signals from one or more GPS satellites 18, (ii) an ambient light sensor 24 for detecting ambient light conditions, (iii) a gyroscope 26 for detecting device rotation, (iv) a compass 28 for detecting device orientation, (v) an accelerometer 32 for detecting device movement, and (vi) a proximity sensor 34 for detecting the presence of nearby objects. The mobile communication device 10 may also include a built-in camera 36 for obtaining digital images and/or video.

Figure 2:
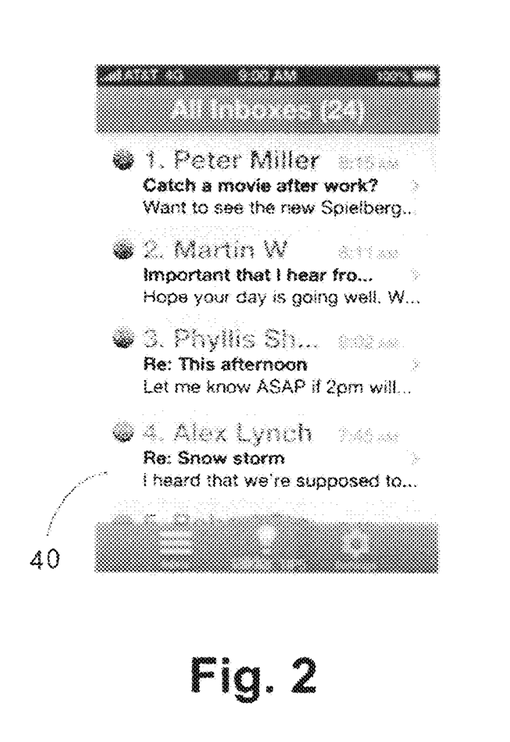
FIG. 2 is an illustration of a message list as may be presented on the display screen of the mobile communication device of FIG. 1.
Figure 3A:
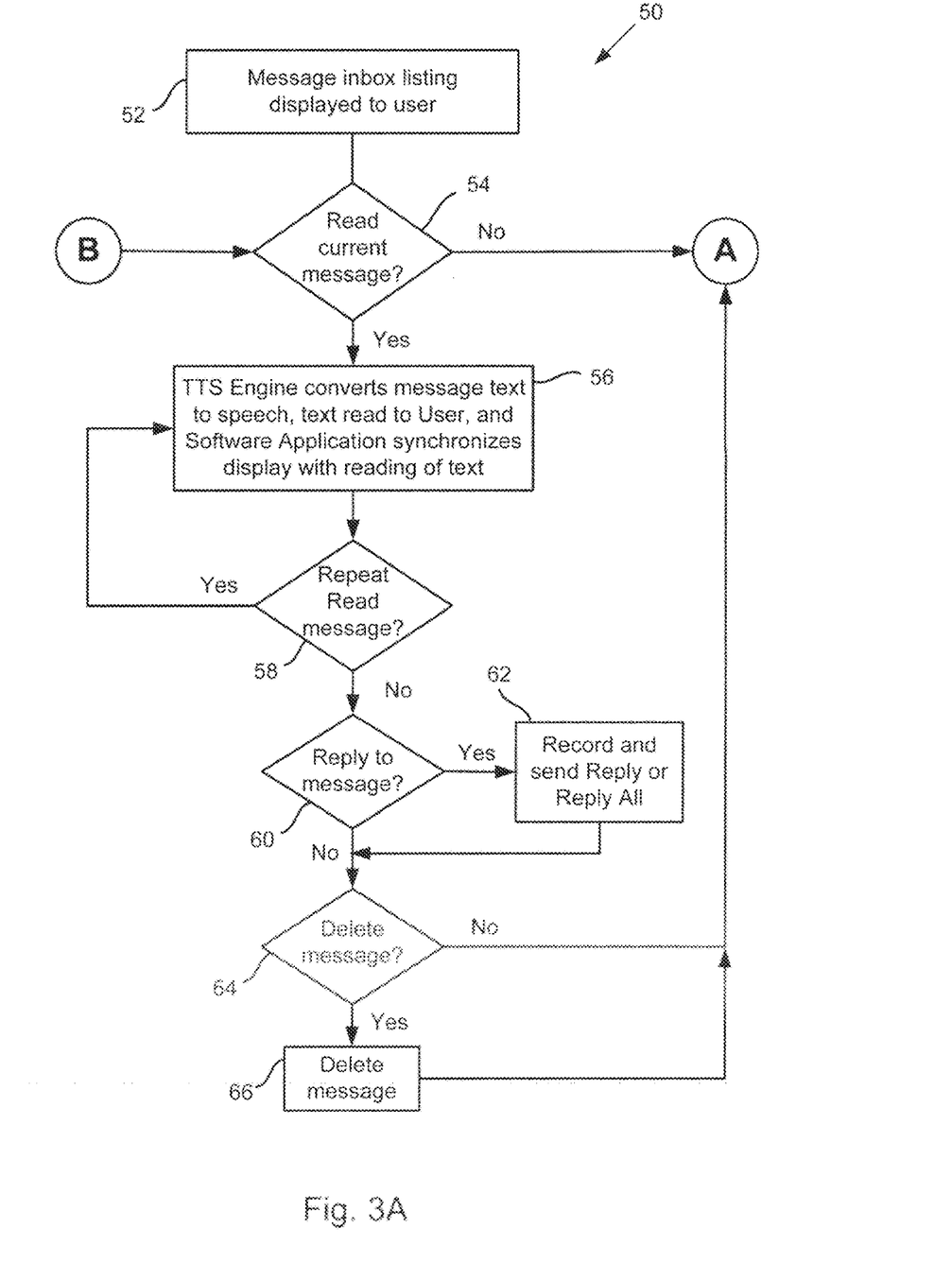
FIGS. 3A and 3B are flow diagrams illustrating operation of the Software Application, in accordance with embodiments of the present invention.
Figure 3B:
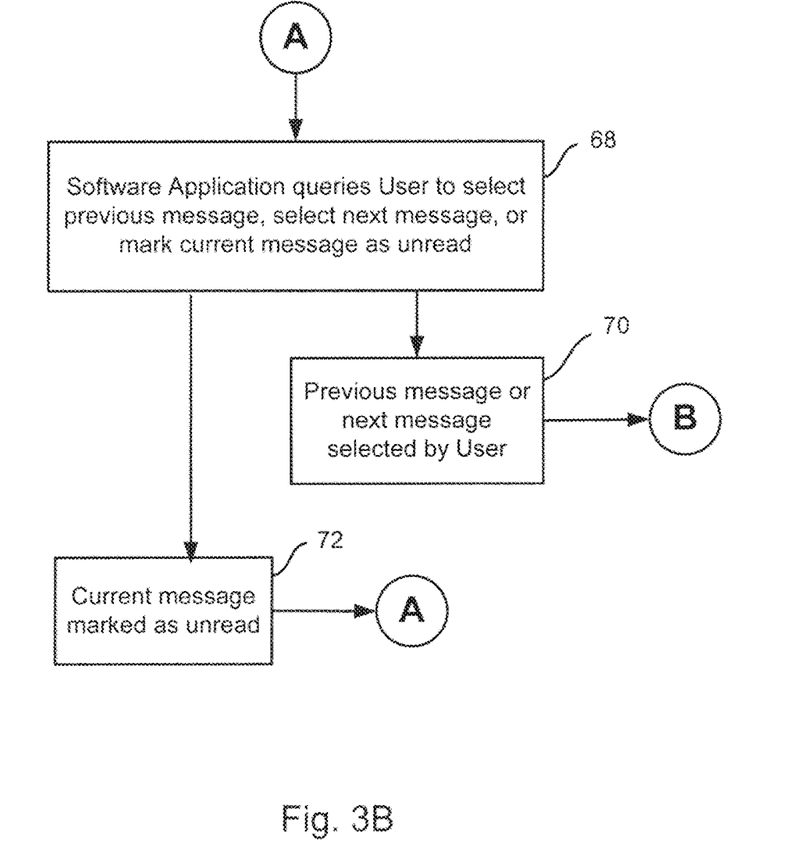

FIG. 2 shows a message inbox listing 40 as may be displayed in the display screen 12, as provided in step 52 of a flow diagram 50 shown in FIGS. 3a and 3b. In an exemplary embodiment, the Software Application 20 may function in conjunction with a text-to-speech (TTS) engine 30 and the speaker 14 to audibly inform the user of: (i) the time of receipt, (ii) the sender, (iii) the message subject, and/or (iv) other header information, for an incoming e-mail message, or other received communication.

The TTS engine 30 and the speaker 14 thus operate in conjunction with a visual display on the display screen 12, where the visual display uses teleprompter technology to provide a text display that is synchronized with the audio being generated by the TTS engine 30 and emitted by the speaker 14.

Figure 4:
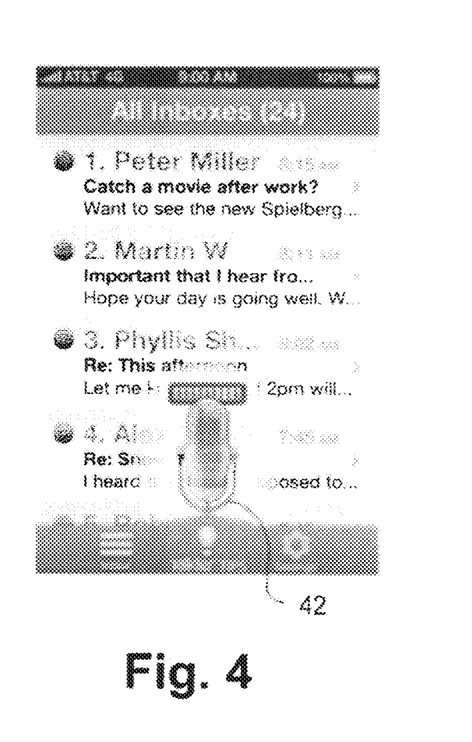
FIG. 4 is an illustration of the message list of FIG. 2 including a microphone icon.

The mobile communication device 10 may output, via the speaker 14, an audio statement such as "You have an unread message from Peter Miller, received at 8:15 AM." A microphone icon 42 may appear in the message inbox listing 40, as shown in FIG. 4, to indicate that the Software Application 20 is ready to accept vocal instructions from the user.

The mobile communication device 10 may also be directed by the user to "read out loud" the body of a selected message in the message inbox listing 40, at decision block 54. If the user has elected to have the selected message read, the TTS engine 30 converts a portion of the message text to audible speech, at step 56.

The user may request that the Software Application 20 repeat the selected message, as decision block 58. The process returns to step 56 and the selected message is repeated. Otherwise, the user may decide whether to reply to the selected message, at decision block 60. If so, the Software Application 20 records the user's response, at step 62, and sends the audio file to one or more recipients having addresses listed in the selected message.

If the user elects to not respond to the selected message, at decision block 60, the user may decide to delete the selected message, at decision block 64. If not, the process moves to step 68. If the message is deleted, at step 66, the Software Application 20 queries the user whether to move to another message, at step 68. The user may elect to move ahead to the next message, or to move back to the previous message, at step 70. The process then returns to decision block 54 where the user may decide whether or not to read the currently-selected message.

If the user decides to mark the current message as unread, at step 72, the user may be queried by the Software Application 20, at step 68, as to whether another message is to be selected. If the user does not elect to have the message read, at decision block 54, the user may be queried by the Software Application 20, at step 68, as to whether the current message is to be marked unread.

If, and when, the user wishes to barge-in during any step of the process illustrated in the flow diagram 50, the disclosed method provides innovative input mechanisms to enable the user to reliably barge-in when the user has intended a barge-in, and to avoid initiating a barge-in scenario when the user has not intended a barge-in.

As used herein, the action of "barge-in" comprises the response of the mobile communication device 10 to pre-established criteria by: (i) pausing or halting the operation of the TTS engine 30 and the scrolling visual display on the display screen 12, and (ii) responding to a command issued by the user after the barge-in criteria have been met.

Figure 5:
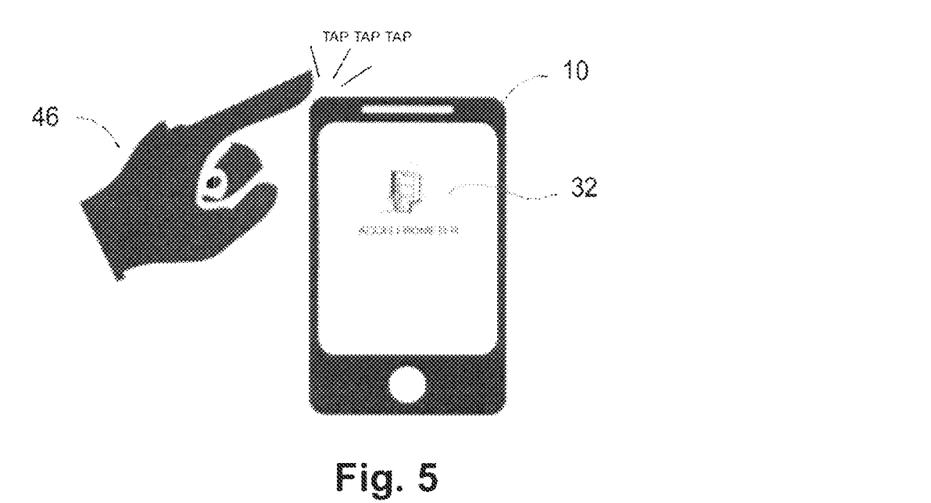
FIG. 5 is an illustration of a user tapping the mobile communication device of FIG. 1.

In accordance with the disclosed method, when the user is accessing the mobile communication device 10, the Software Application 20 may have been programmed to recognize that the user should be allowed to barge-in if the user executes a pre-specified "triple action." For example, the user 46 may tap the housing of the mobile communication device 10 three times (i.e., a "triple-tap") within a pre-specified period of time, shown in FIG. 5. The accelerometer 32 may function to signal to the mobile communication device 10 via the Software Application 20 that the process illustrated in the flow diagram 50 is to be paused, and the Software Application 20 is to await a verbal input from the user 46. This "triple-tap" may be an effective alternative to audible user-generated signals as described below, under circumstances where an audible signal might be difficult to detect, such as when there is loud background noise.

Alternatively, the user 46 may utter a series of three, substantially identical, audio signals, such as "Hey, hey, hey!" or "Stop, stop, stop." Or the user 46 may knock or rap three times on a convenient nearby percussive surface, such as a driver-side car window or a table top. Such audio signals may be detected by the microphone 16, and would signal to the mobile communication device 10 to pause audio output from the speaker 14 and await a verbal input from the user 46.

For example, a vehicle traveling over irregular and bumpy roads may transmit shocks to the accelerometer 32. But those bumps in the road would be distinguishable from an intentional barge-in "triple tap" by the disclosed method, because the bumps in the road are unlikely to meet the time window, amplitude and regularity criteria required to initiate a barge-in.

On the other hand, it is relatively easy for the user to meet these time window, amplitude and regularity criteria. These criteria mimic everyday human interactions, such as tapping another person on the shoulder for his or her attention, or knocking on a closed door to get the attention of another person on the other side, or speaking a phrase such as "Hey, hey, hey" that is intended to interrupt another person who is speaking so as to make them stop speaking and listen.

Figure 6:
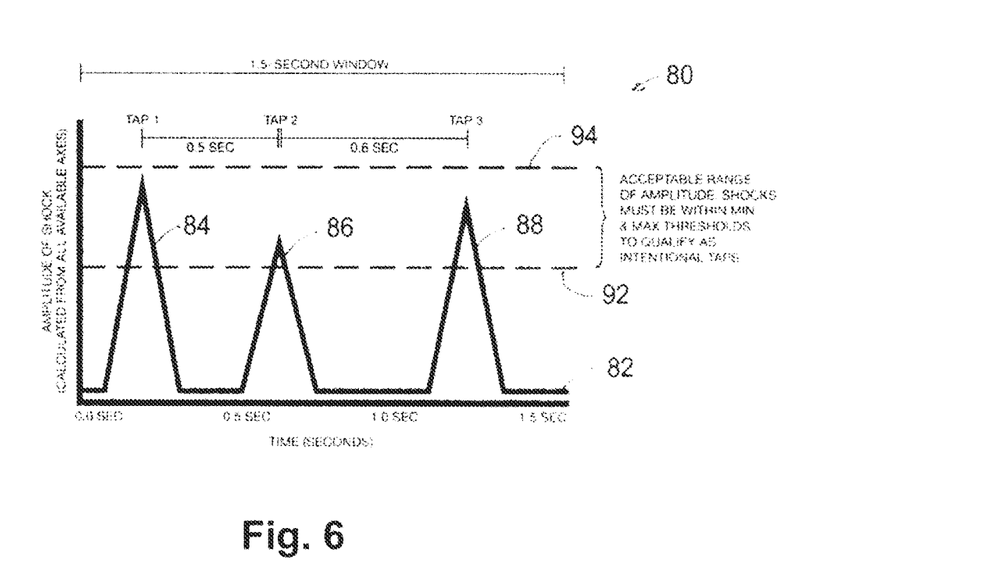
FIG. 6 is an amplitude curve as sensed by an accelerometer in the mobile communication device of FIG. 5, in response to the tapping action provided by the user.

FIG. 6 is a graph 80 showing a shock amplitude curve 82 as may be sensed by the accelerometer 32 in the mobile communication device 10, in response to the three physical taps made by the user 46. In the example provided, the Software Application 20 has been programmed to respond to a series of three pulses 84, 86, 88, provided that: (i) the pulses each have a peak amplitude greater than a minimum detected level 92, (ii) less than a maximum detected level 94, and (iii) all three pulses 84, 86, 88 occur within a specified time window (1.5 seconds, in this example).

The parameters shown in FIG. 6 are exemplary, and the Software Application 20 can be programmed to respond to a different number of pulses (e.g., user-provided taps or audio signals), and/or where the shock amplitude curve 82 comprises amplitude and time interval parameters different from those shown in FIG. 6. For example, the specified time interval may range from about one second to about ten seconds. In an exemplary embodiment, for example, there may be an additional parameter specified such that the pulses 84, 86, 88 must be essentially evenly-spaced, or that each pulse 84, 86, 88 should occur within a specified time interval within pre-specified tolerances, within a total time interval of one to ten seconds.

Accordingly, the regularity of these criteria differentiates three such shocks or pulses from unintended shocks that are not issued by the user 46 as an intentional triple-tap barge-in command. When the Software Application 20 detects the three pulses 84, 86, 88 meeting these criteria, then the Software Application 20 may interrupt normal operation and may offer the user 46 an opportunity to issue a spoken command in the clear, thus successfully accomplishing barge-in.

Figure 7:
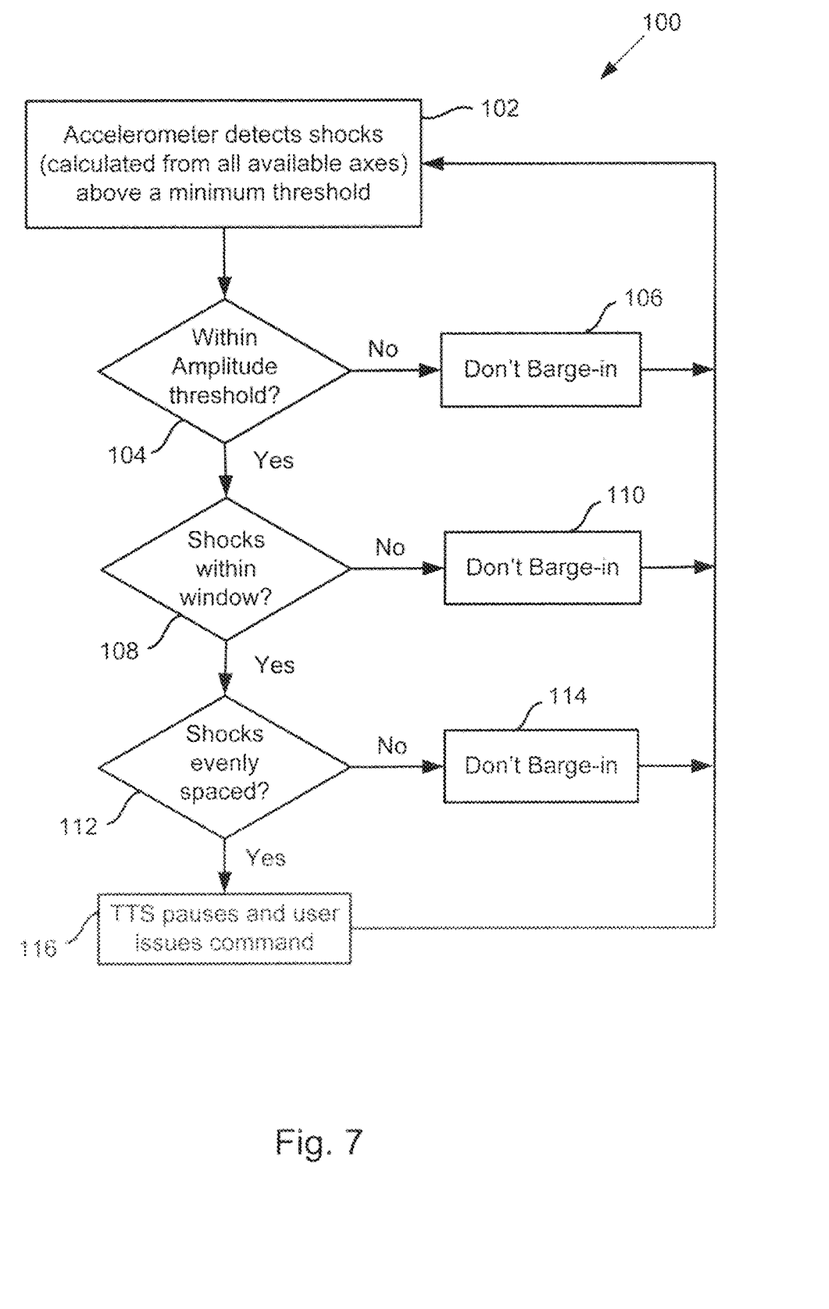
FIG. 7 is a flow diagram listing a barge-in process followed by the Software Application in the mobile communication device of FIG. 5, in response to a series of taps by the user.

This can be shown with reference to a flow diagram 100, in FIG. 7. The accelerometer 32 may detect a series of shocks that meet pre-specified criteria recognized by the Software Application 20, at step 102. In an exemplary embodiment, the accelerometer 32 is configured to sense movement in three orthogonal axes so as to detect various types of user taps that produce acceleration signals above pre-specified thresholds.

If the detected shock or acceleration signal is not within the pre-specified amplitude parameters, at decision block 104, the Software Application 20 continues the current process without providing for a barge-in by the user 46, at step 106, and the process returns to step 102. If the accelerometer has not detected three sequential shocks or acceleration signals within the pre-specified time interval, at decision block 108, the Software Application 20 continues the current process without providing for a barge-in by the user 46, at step 110, and the process returns to step 102.

If the detected shocks or acceleration signals are not substantially evenly spaced apart in the pre-specified time interval, at decision block 112, the Software Application 20 continues the current process without providing for a barge-in by the user 46, at step 114, and the process returns to step 102. Otherwise, the TTS 38 pauses in the current sequence of actions, at step 116, and provides for a barge-in so as to allow the user to issue a command to the Software Application 20. The process then returns to step 102.

As can be seen in FIG. 6, a first time interval—from pulse 84 to pulse 86—is measured as 0.5 seconds, and a second time interval—from pulse 86 to pulse 88—is measured as 0.6 seconds. Hence, in the example provided, the second time interval is approximately 20% larger than the first time interval. The Software Application 20 may consider a 20 percent difference to qualify the series of three pulses 84, 86, 88 as being evenly-spaced under one set of criteria or, under another set of criteria, may consider the 20% time interval differential too large to qualify as being evenly spaced.

The concept of using any three sequential, substantially similar, audible sounds capable of being produced by the user 46 (such as three finger snaps, three raps on the driver-side window, or the utterance of the phrase "Hey, Hey, Hey") provides for a reliable method and system, in that the Software Application 20 is programmed to recognize essentially any user-produced spoken or mechanical sound. The primary requirement for identification and detection by the Software Application 20, is that the user-produced sound is repeated a specified number of times within a particular short period, such as three pulses within 1.5 seconds, as above.

Figure 8:
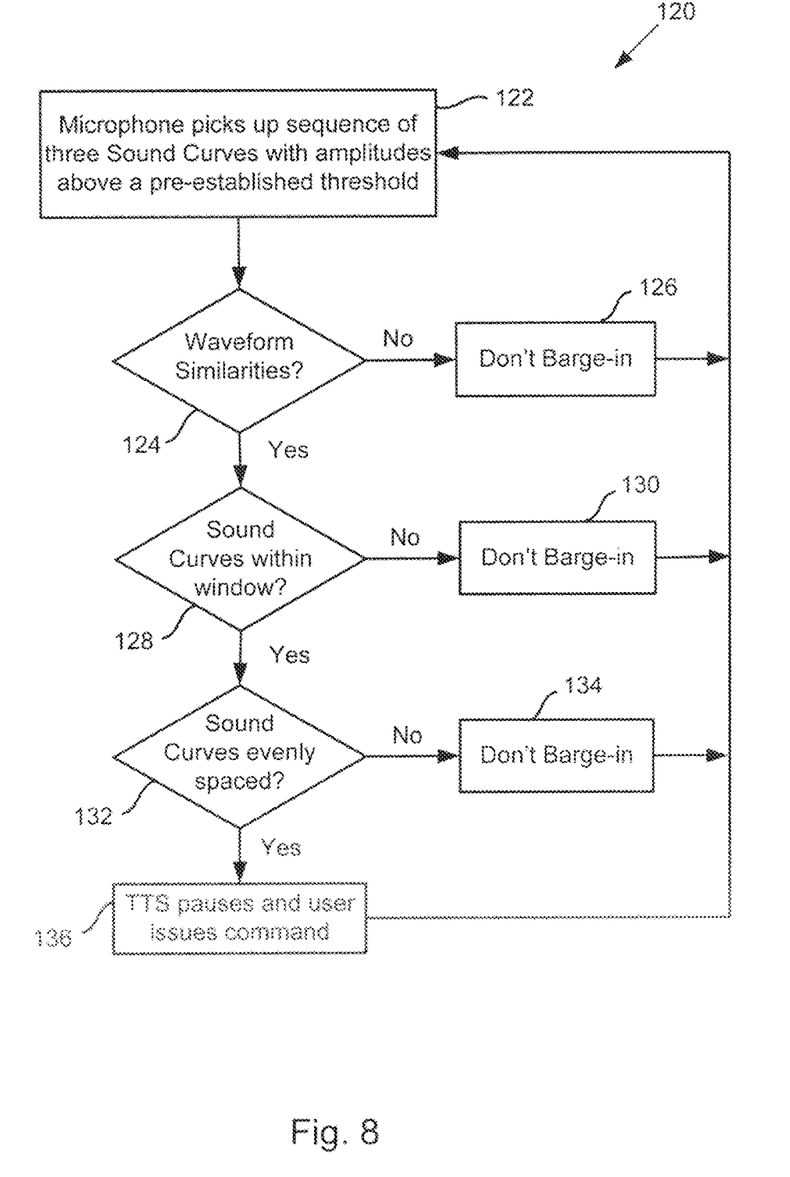
FIG. 8 is a flow diagram listing a barge-in process followed by the Software Application in the mobile communication device of FIG. 5, in response to a repetition of substantially similar audio sounds or words made or produced by the user.

The method of using three or more sounds to effect a barge-in can be shown with reference to a flow diagram 120, in FIG. 8. The microphone 16 and speech recognizer 38 may detect a series of audio signals or sound curves that exceed a pre-specified threshold known to the Software Application 20, at step 122. In an exemplary embodiment, the Software Application 20 may be configured to detect whether there is an identifiable similarity among each of three consecutive audio signals or sounds above pre-specified thresholds. This may occur, for example, when the user repeats a word or sound three or more times.

If the detected audio signals or sound curves are not substantially similar, at decision block 124, the Software Application 20 continues the current task without providing for a barge-in by the user 46, at step 126, and the process returns to step 122. However, if the speech recognizer 38 does detect similarity, but the three similar audio signals or sound curves are not within a pre-specified time interval, at decision block 128, the Software Application 20 continues the current task without providing for a barge-in by the user 46, at step 130, and the process returns to step 122.

If the detected audio signals or sound curves are similar and occur within a designated time interval, but are not spaced apart within specifications, at decision block 132, the Software Application 20 continues the current task without providing for a barge-in by the user 46, at step 134, and the process returns to step 122. Otherwise, the TTS 38 pauses the current text-to-speech audio output, at step 136, and provides for a user barge-in. This pause in output allows for a user-issued command to be received and implemented by the Software Application 20. The process then returns to step 122.

The Software Application 20 functions to detect three sounds within a specified period, such as one to ten seconds, and above a particular, pre-specified minimum volume, such as may be "factory-set" in the mobile communication device 10, or selected by the user when "setting preferences" for the mobile communication device 10. The Software Application 20 may assess that the three sounds are substantially evenly spaced, within a specified tolerance, and of similar sound signature to each other, within a specified tolerance. The regularity of these criteria differentiates three such sounds from unintended repeating sounds that are not issued by the user 46 as an intentional triple-tap barge-in command. When the Software Application 20 detects the three sounds meeting these criteria, then the Software Application 20 interrupts normal operation and offers the user an opportunity to issue a spoken command in the clear, thus successfully accomplishing barge-in.

As can be appreciated by one skilled in the current state of the art, voice recognition software has limited accuracy, as noted above. If a user wanted to use an audio signal to effect barging-in under existing technologies and systems, the detection system would need to recognize an expected utterance or spoken phrase using a speech recognizer (e.g., "Please pause, System" or "Operator"). However, as conventional speech recognizers are limited in their accuracy under the best of conditions, and may be even more limited under challenging acoustic conditions, such as: (i) operation inside a moving automobile with the user employing a hands-free speakerphone system, and (ii) when the operating conditions include ambient road noise.

However, by using the disclosed method, the Software Application 20 need only identify three candidate sounds as being essentially identical, that is, having essentially the same audio signature or sound curve. This type of pattern matching computation is far simpler and far more accurate than the computational task of a modern speech recognizer that must identify and differentiate phonemes uttered by a range of different speakers with different vocal characteristics. This innovation makes the computational task easier still because the three candidate sounds may comprise user-spoken utterances, or simple sounds with simple sound curves, such as a finger snap. Such simple sound curves can be measured and compared in a straightforward manner, such as by using an appropriate software program.

By contrast, user-spoken utterances such as "Please pause, System," are typically more complex than simple sound curves, and vary from speaker to speaker. Indeed, spoken utterances are actually more successful when they contain multiple syllables and linguistic differentiators such as various consonants, vowels and phonemes. Speech recognition has difficulty differentiating between simple monosyllabic utterances such as "Yes" vs. "No."

Accordingly, the present method offers the advantage that the user does not require training with the Software Application 20—unlike some conventional speech recognizers which require the user to recite a pre-specified script in order to "train" the speech recognition system to learn each speaker's voice and the speaker's idiosyncratic vocal characteristics. A further advantage of the disclosed method is that the Software Application 20 does not require special recognition of specific sounds (certain phonemes, vowels or consonants, for instance), as most conventional speech recognizers must do. Accordingly, the disclosed method can match essentially any three sounds provided to the microphone 16, as long as the three sounds provided are substantially similar. A further advantage of the present method is that the relatively simpler computational tasks may be accomplished directly on a mobile device, without requiring that the audio signals be transmitted over a cell data network to a more powerful cloud-based computing system.

In addition to "reading" e-mail messages, the Software Application 20 may further provide to the user dynamic text-based information such as, for example, any one or more of: (i) news headlines, (ii) SMS text messages, (iii) web browsing, (iv) web logs (blogs), (v) the User's calendar, (vi) the User's "To-Do" List, (vii) one or more files attached to a message, (viii) a weather report, (ix) a Web-based article. In an exemplary embodiment, the Software Application 20 may be downloaded into the mobile communication device 10 for a nominal fee, or may be provided at no charge. The Software Application 20 may function to provide one or more audible advertisements, after one or more messages have been read aloud to the user, to offset the cost of having installed the Software Application 20.

While primarily described with respect to the playback of messages on mobile devices, the techniques and systems described herein may be implemented on virtually any device. For example, the device may be a television, computer, radio, vehicle, toy, console or product on which a software application may be installed or embedded. The "interruption" of the application and/or operation of the device may trigger additional functions (starting or stopping an application, presenting alternative media, etc.), or prompt the user for subsequent commands to further process messages or media being presented on the device.

The Software Application 20 may be implemented on hardware such as a smart or dumb terminal, network computer, personal digital assistant, wireless device, smartphone, tablet, television, gaming device, music player, mobile telephone, laptop, palmtop, wireless telephone, information appliance, workstation, minicomputer, mainframe computer, or other computing device, that is operated as a general purpose computer or a special purpose hardware device that can execute the functionality described herein. The Software Application 20 may be implemented on a general purpose computing device in the form of a computer including a processing unit, a system memory, and a system bus that couples various system components including the system memory to the processing unit.

The described systems may include a plurality of software processing modules stored in a memory and executed on a processor in the manner described herein. The program modules may be in the form of any or more suitable programming languages, which are converted to machine language or object code to allow the processor or processors to read the instructions. The software may be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories may store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

In various embodiments, the devices include a web browser, client application software, or both. The web browser allows the client to request a web page or other downloadable program, applet, or document (e.g., from the server(s)) with a web page request. One example of a web page is a data file that includes computer executable or interpretable information, graphics, sound, text, and/or video, that can be displayed, executed, played, processed, streamed, and/or stored and that can contain links, or pointers, to other web pages. In one embodiment, a user of the client manually requests a web page from the server. Alternatively, the device automatically makes requests with the web browser. Examples of commercially available web browser software are Microsoft® Internet Explorer®, Mozilla® Firefox®, and Apple® Safari®.

In some embodiments, the devices include client application software. The client application software provides functionality to the device that provides for the implementation and execution of the features described herein. The client application software may be implemented in various forms, for example, it may be in the form of a web page, widget, and/or Java, JavaScript, .Net, Silverlight, C++, C, Flash, and/or other applet or plug-in that is downloaded to the device and runs in conjunction with the web browser. The client application software and the web browser may be part of a single client-server interface; for example, the client software can be implemented as a "plug-in" to the web browser or to another framework or operating system. Any other suitable client software architecture, including but not limited to widget frameworks and applet technology may also be employed with the client software.

A communications network may connect the devices with one or more servers and/or with each other. The communication may take place via any media such as standard telephone lines, LAN or WAN links (e.g., T1, T3, 56kb, X.25), broadband connections (ISDN, Frame Relay, ATM), wireless links (802.11, Bluetooth, GSM, CDMA, etc.), and so on. The network may carry TCP/IP protocol communications, and HTTP/HTTPS requests made by a web browser, and the connection between the clients and servers can be communicated over such TCP/IP networks. The type of network is not a limitation, however, and any suitable network may be used.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture. In other cases the invention may take the form of a downloadable application made available in either a public or private application platform.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A computer-implemented method for enabling a user to interrupt operation of a mobile communication device executing a software application during a presentation of an audible message, the mobile communication device comprising a processing device, a microphone, and an accelerometer, the method comprising the steps of:
   A. receiving, by the processing device, an incoming electronic message comprising textual content;
   B. translating, by conventional speech synthesis executed on the processing device, the textual content to an audio stream;
   C. initiating playback of the audio stream within the software application;
   D. receiving, by the processing device, while the mobile communication device is playing the audio stream, a series of sequential, substantially similar user-generated barge-in signals detected by the accelerometer;
   E. receiving, by the processing device, while the mobile communication device is playing the audio stream, a series of sequential, substantially similar user-generated barge-in signals detected by the microphone;
   F. validating, by the processing device, that the user-generated barge-in signals in the series detected by the accelerometer and the user-generated barge-in signals in the series detected by the microphone meet specified criteria for similarity;
   G. translating, by the processing device, the validated user-generated barge-in signals into a command to the software application; and
   H. triggering interruption of playback of the audio stream within the software application based on the translated command.

2. The method of claim 1 wherein each substantially similar user-generated barge-in signal in the series detected by the accelerometer comprises a signal generated by a physical motion of the user.

3. The method of claim 1 wherein each substantially similar user-generated barge-in signal in the series detected by the accelerometer comprises a signal generated by a touching of the mobile communication device by the user.

4. The method of claim 1 wherein each substantially similar user-generated barge-in signal in the series detected by the accelerometer comprises a signal generated by a movement of the mobile communication device by the user.

5. The method of claim 1 wherein each substantially similar user-generated barge-in signal in the series detected by the accelerometer comprises a signal generated by a striking of the mobile communication device by the user.

6. The method of claim 1 wherein the translated command to the software application triggering interruption of playback within the software application comprises halting the software application.

7. The method of claim 1 wherein the translated command to the software application triggering interruption of playback within the software application comprises listening for a user-generated voice command to be received at the software application by the microphone.

8. The method of claim 1 wherein the translated command to the software application triggering interruption of playback comprises initiating delivery of media content by the software application.

9. The method of claim 1, wherein translating the validated series of user-generated barge-in signals into a command to the software application comprises interrupting a first operation being executed within the software application and then triggering any second operation within the software application.

10. The method of claim 1, wherein validating that the series of user-generated barge-in signals meet specified criteria for similarity comprises determining that at least one of:
   a total time duration of each of the barge-in signals in either series is substantially similar to a respective total time duration of any other barge-in signal in the series;
   an elapsed time between barge-in signals in either series is substantially similar to a respective elapsed time between any barge-in signal in the series; and
   an amplitude of each of the barge-in signals in either series is substantially similar to a respective amplitude of any other barge-in signal in the series.

11. The method of claim 1, wherein each substantially-similar user-generated barge-in signal in the series detected at the microphone comprises a single percussive sound generated by the user.

12. The method of claim 1, wherein each substantially-similar user-generated barge-in signal in the series detected at the microphone comprises a single mechanical sound generated by the user.

13. The method of claim 1, wherein each substantially-similar user-generated barge-in signal in the series detected at the microphone comprises a single spoken word uttered by the user.

14. The method of claim 1, wherein each substantially-similar user-generated barge-in signal in the series detected at the microphone comprises a single spoken phrase uttered by the user.

15. The method of claim 1, wherein each substantially-similar user-generated barge-in signal in the series detected at the microphone comprises a single verbal sound made by the user.

16. The method of claim 1, wherein each substantially-similar user-generated barge-in signal in the series detected at the microphone comprises a single audible sound generated by the user.

17. The method of claim 1, wherein validating that the user-generated barge-in signals detected at the accelerometer meet specified criteria for similarity comprises measuring, by the processing device, for each user-generated barge-in signal of the series at least one of amplitude, frequency, total time duration, and elapsed time between signals and determining, by the processing device, that any of the measured amplitude, frequency, total time duration, and elapsed time between signals for the user-generated barge-in signal is substantially similar to a respective amplitude, respective frequency, respective total time duration, and respective elapsed time between signals of another barge-in signal of the series.

18. The method of claim 1, wherein validating that the user-generated barge-in signals detected at the microphone meet specified criteria for similarity comprises measuring, by the processing device, for each user-generated barge-in signal of the series at least one of amplitude, frequency, and elapsed time between signals and determining, by the processing device, that any of the measured amplitude, frequency, and elapsed time between signals for the user-generated barge-in signal is substantially similar to a respective amplitude, respective frequency, and respective elapsed time between signals of another barge-in signal of the series.

19. A system for at least one of interrupting and barging in on operation of a mobile communication device executing a software application during a presentation of an audible message, the system comprising:
  A. a microphone and an accelerometer mounted in the mobile communication device;
  B. a processor for executing computer-executable instructions; and
  C. a memory for storing the computer-executable instructions, that, when executed by the processor, barge in on the audible message presentation by:
    receiving an incoming electronic message comprising textual content;
    translating the textual content to an audio stream;
    initiating playback of the audio stream within the software application;
    receiving, while the mobile communication device is playing the audio stream, a series of sequential, substantially similar user-generated barge-in signals detected by the accelerometer;
    receiving, while the mobile communication device is playing the audio stream, a series of sequential, substantially similar user-generated barge-in signals detected by the microphone;
    validating that the user-generated barge-in signals in the series detected by the accelerometer and the user-generated barge-in signals in the series detected by the microphone meet specified criteria for similarity;
    translating the validated user-generated barge-in signals into a command to the software application; and
    triggering interruption of playback of the audio stream within the software application based on the translated command.

20. The system of claim 19 wherein each substantially similar user-generated barge-in signal in the series detected by the accelerometer comprises a signal generated by a physical motion of the user.

21. The system of claim 19 wherein each substantially similar user-generated barge-in signal in the series detected by the accelerometer comprises a signal generated by a touching of the mobile communication device by the user.

22. The system of claim 19 wherein each substantially similar user-generated barge-in signal in the series detected by the accelerometer comprises a signal generated by a movement of the mobile communication device by the user.

23. The system of claim 19 wherein each substantially similar user-generated barge-in signal in the series detected by the accelerometer comprises a signal generated by a striking of the mobile communication device by the user.

24. The system of claim 19, wherein the translated command to the software application comprises triggering a routing of audio detected at the microphone to the software application and awaiting verbal input at the microphone from the user to the software application.

25. The system of claim 19, wherein the translated command to the software application triggering interruption of playback within the software application comprises halting the software application.

26. The system of claim 19, wherein the translated command to the software application triggering interruption of playback within the software application comprises listening for a user-generated voice command to be received at the software application by the microphone.

27. The system of claim 19, wherein the translated command to the software application triggering interruption of playback comprises initiating delivery of media content by the software application.

28. The system of claim 19, wherein validating that the user-generated barge-in signals in the series detected by the accelerometer and the user-generated barge-in signals in the series detected by the microphone meet specified criteria for similarity comprises determining that at least one of:
  an amplitude of each of the barge-in signals in either series is substantially similar to a respective amplitude of any other barge-in signal in the series;
  a total time duration of each of the barge-in signals in either series is substantially similar to a respective total time duration of any other barge-in signal in the series; and
  an elapsed time between barge-in signals in either series is substantially similar to a respective elapsed time between any other barge-in signal in the series.

29. The system of claim 19, wherein each user-generated barge-in signal detected by the microphone comprises a single percussive sound generated by the user.

30. The system of claim 19, wherein each user-generated barge-in signal detected by the microphone comprises a single mechanical sound generated by the user.

31. The system of claim 19, wherein each user-generated barge-in signal detected by the microphone comprises a single spoken word uttered by the user.

32. The system of claim 19, wherein each user-generated barge-in signal detected by the microphone comprises a single spoken phrase uttered by the user.

33. The system of claim 19, wherein each user-generated barge-in signal detected by the microphone comprises a single verbal sound made by the user.

34. The system of claim 19, wherein each user-generated barge-in command signal detected by the microphone comprises a single audible sound generated by the user.

35. The system of claim 19, wherein validating that the user-generated barge-in signals detected at the accelerometer meet specified criteria for similarity comprises measuring, by the processing device, for each user-generated barge-in signal of the series at least one of amplitude, frequency, total time duration, and elapsed time between signals and determining, by the processing device, that any of the measured amplitude, frequency, total time duration, and elapsed time between signals for the user-generated barge-in signal is substantially similar to a respective amplitude, respective frequency, respective total time duration, and respective elapsed time between signals of another barge-in signal of the series.

36. The system of claim 19, wherein validating that the user-generated barge-in signals in the series detected by the microphone meet specified criteria for similarity comprises measuring, by the processing device, for each user-generated barge-in signal of the series at least one of amplitude, frequency, and elapsed time between signals and determining, by the processing device, that any of the measured amplitude, frequency, and elapsed time between signals, for the user-generated barge-in signal is substantially similar to a respective amplitude, respective frequency, and respective elapsed time between signals of another barge-in signal of the series.

* * * * *